June 26, 1956 H. C. GOODRICH 2,752,431

AMPLIFIER GAIN CONTROL

Filed Oct. 22, 1953

INVENTOR.
Hunter C. Goodrich

BY [signature]
ATTORNEY

United States Patent Office 2,752,431
Patented June 26, 1956

2,752,431

AMPLIFIER GAIN CONTROL

Hunter C. Goodrich, Collingswood, N. J., assignor to Radio Corporation of America, a corporation of Delaware Application October 22, 1953, Serial No. 387,739

6 Claims. (Cl. 179—171)

Figures 1, 2:
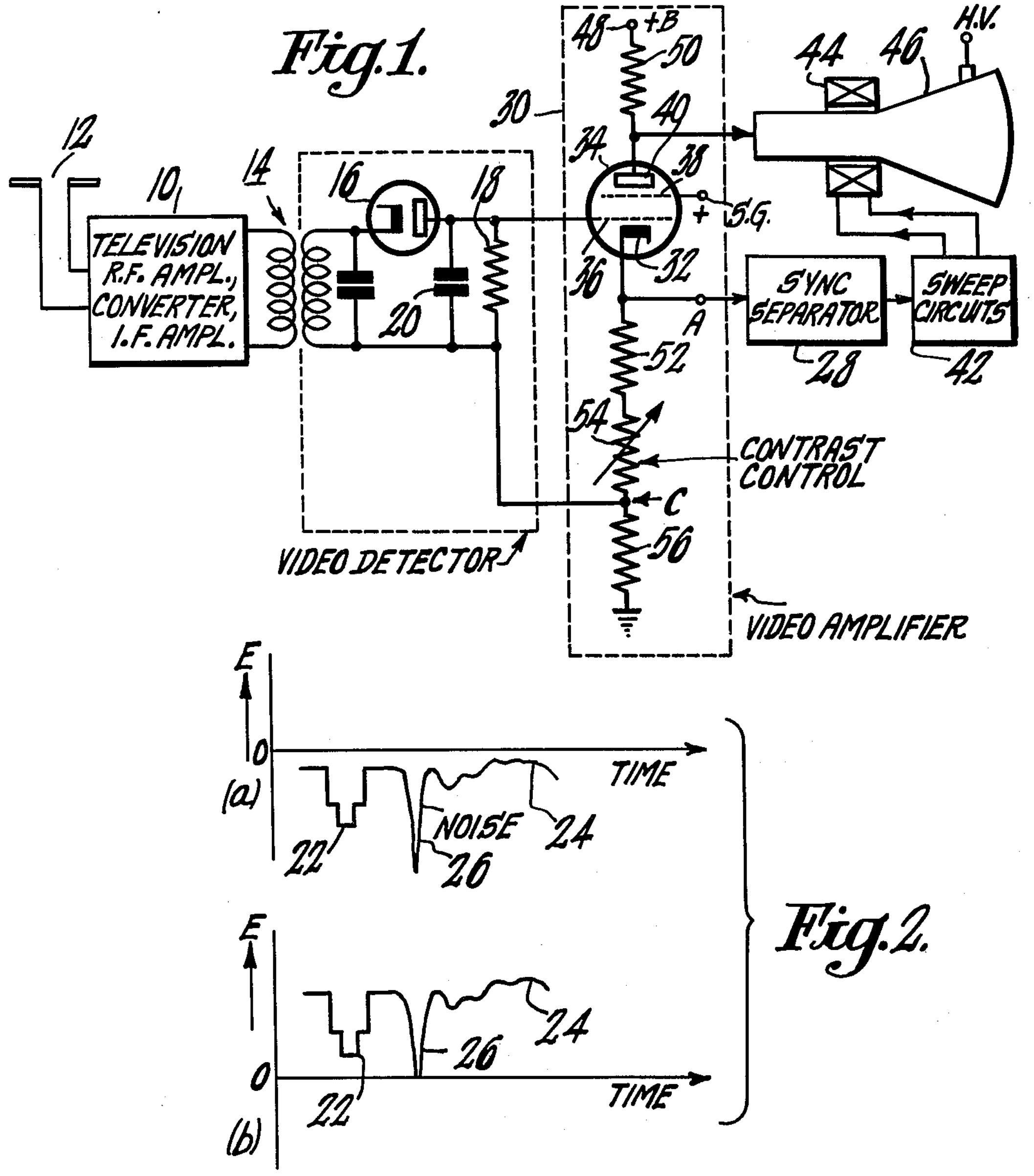

The present invention relates to television receiver gain control apparatus and, more particularly, to such apparatus as is well suited for providing a composite television signal to a synchronizing pulse separating device.

As is generally known in the art, television gain or "contrast" controls are included in a receiver for the purpose of varying the peak-to-peak amplitude of the video signal prior to its application to the image reproducing kinescope, the greater the gain, the more contrast being provided in the resultant image.

Ideally, a video contrast control which is provided in conjunction with a video amplifier stage which also supplies the composite signal to a synchronizing pulse separator circuit must meet certain requirements which normally are considered as being in conflict, as follows: First, the contrast control should utilize the gain of the video amplifier stage for amplifying the signal being applied to the sync separator device. Second, the setting of the contrast control should not affect the level of the signal applied to the sync separator. Third, the contrast control should not capacitively load the video output circuit, as is ordinarily the case where the contrast control takes the form of a potentiometer in the anode circuit of the video amplifier. Finally, the contrast control should not vary the input level applied to the video amplifier, since such change interferes with the noise clipping achieved in that stage.

It is, therefore, a primary object of the present invention to provide a new and improved video amplifier contrast control which resolves the apparent anomaly set forth above.

Contrast controls in the form of a variable resistor in the cathode circuit of a video amplifier are well known to those skilled in the art, their function being that of varying the gain of the amplifier through the introduction of a variable amount of cathode degeneration. Since, in the case of certain sync separator circuits, such, for example, as a transistor sync separator device, it is necessary or at least desirable to feed the sync separator from a low impedance source, prior art contrast controls prevent the cathode circuit of the video amplifier from being used as the source of signals for the sync separator, since the amplitude of the signal appearing at the cathode must vary as a function of the contrast control setting.

Hence, it is a principal object of the present invention to provide a contrast control in the form of a variable cathode resistor in the circuit of a video amplifier, which contrast control does not cause the amplitude of the signal appearing on the cathode to vary as a function of contrast control setting.

Stated otherwise, it is an aim of the invention to provide a cathode-resistor type of contrast control which has negligible effect upon the peak-to-peak amplitude of the signal appearing on the cathode of the video amplifier.

In general, the present invention contemplates the provision of a contrast control for a television receiver, which takes the form of a variable resistor located between the cathode of the tube and one of the terminals which the signal is applied from the preceding stage. Further in accordance with the invention, an additional resistor is connected between that input terminal and a a source of constant potential such, for example, as ground. By virtue of the second-named resistor, amplitude changes which would otherwise result in the voltage appearing on the cathode as a result of varying the contrast controls are substantially compensated for, in order to provide relatively constant gain to the signal at the cathode.

Additional objects and advantages of the present invention will become apparent to persons skilled in the art from a study of the following detailed description of the accompanying drawing, in which:

Fig. 1 illustrates, by way of block and schematic circuit diagram, a television receiver embodying the principles fo the present invention; and Fig. 2 illustrates certain waveforms useful in the explanation of the apparatus of Fig. 1.

Referring to the drawing and, more particularly, to Fig. 1 thereof, there is illustrated the R-F tuner portion 10 of a television receiver to which received video-modulated carrier waves are applied via antenna 12. The intermediate frequency wave is coupled via transformer 14 to a conventional detector shown in the form of diode 16 having a load resistor 18 in parallel with a capacitor 20.

Curve *a* of Fig. 2 illustrates diagrammatically the voltage waveform appearing across the detector load resistor 18. That waveform includes synchronizing pulses 22, video information 24, and, for purposes of description, a noise pulse 26 which extends in the same direction as the synchronizing pulse 22 but which is of greater amplitude. While it has been proposed that the circuitry for separating the synchronizing information from the video information (i. e., sync separator) be supplied with the composite signal directly from the video detector, it is considered preferable, in many instances, to drive the signal for application to the sync separator 28 from the video amplifier 30 since, as shown by curve *b* of Fig. 2, the noise pulses are clipped therein, by reason of the fact that the noise pulses drive the control electrode of the video amplifier beyond cutoff.

Thus, in accordance with the present invention, the sync separator 28 is illustrated as deriving its composite signal from the cathode 32 of the video amplifier tube 34 which also includes a control electrode 36, screen electrode 38 and anode 40.

Prior to discussing the arrangement and operation of the video amplifier 30, and in the interest of completeness of description, it is to be noted that the sync separator 28, which may be of any form designed to operate upon a signal from a low impedance source, separates the synchronizing information or pulses from the balance of the composition signal and applies the pulses to vertical and horizontal deflection waveform-generating apparatus indicated by block 42. The sweep circuits 42, by causing suitably shaped currents to flow in deflection coils 44, effect deflection of an electron beam in kinescope 46 in two mutually perpendicular directions, whereby to produce a raster in a conventional manner.

Anode 40 of the video amplifier tube 34 is connected to terminal 48 which, as illustrated, constitutes a point of fixed, positive operating potential (+B), the circuit from anode 40 to terminal 48 including a load impedance indicated as resistor 50. The cathode 32 of amplifier 34 is connected to a point of fixed potential ("ground") through a series circuit including resistor 52, variable contrast control resistor 54 and resistor 56, the bottom of detector load resistor 18 being connected to point C at the junction of resistor 54 and 56. The amplified video signal is coupled via lead 58 from the anode of the video amplifier to a conduction-controlling electrode (not shown) of kinescope 46, for the purpose of varying the intensity of its electron beam in accordance with the electrical signal, all in a well-known manner. Since the cathode 32 of amplifier 34 is connected through terminal "A" to the input of sync separator 28, whereby to apply to the latter the composite video signal from which the circuit 28 is to remove synchronizing pulses, it is necessary for proper operation of the sync separator that the signal at point "A" be free of any amplitude change as a result of varying video amplifier gain or the like. That is to say, the contrast control 54 serves to vary the contrast of the image produced by kinescope 46 by varying the gain of tube 34 which, in turn, changes the peak-to-peak amplitude of the signal applied to lead 58. More specifically, when the value of resistor 54 is increased, there results an increased cathode degeneration, so that the gain of amplifier 34 is correspondingly decreased. Conversely, a decrease in resistor 54 results in decreased cathode degeneration with a proportionately increased gain for tube 34. As has been stated above, the use of a variable cathode resistor in the circuit of a video amplifier for purposes of setting contrast is generally well-known in the art. As has also been stated, however, since point "A" is intended to furnish the sync separator 28 with a composite signal whose amplitude does not vary as a function of contrast control setting, the apparatus of Fig. 1 further includes the resistor 56. The purpose and function of resistor 56 are as follows: While increasing resistor 54 for decreased contrast causes point "A" to approach more closely the voltage on the control electrode 36 so that, for example, a rising voltage on the control electrode would tend to cause the voltage at point "A" to rise, the increased value of resistor 54 decreases the gain of tube 34. Reducing the gain of amplifier 34 causes a smaller current to flow through resistor 56, so that the voltage appearing thereacross is similarly decreased. Thus, it may be seen that resistor 56 compensates for changes in signal amplitude at point "A" which would otherwise result from varying the value of the contrast control resistor 54. Stated otherwise, when resistor 54 is increased to reduce image contrast, the increased voltage at point "A" resulting form resistor 54 is compensated for by the decreased voltage at point C. Since the voltage at point "A" actually constitutes the sum of the voltage drops across resistors 52, 54 and 56, the actual signal applied to the sync separator remains substantially constant despite changes in contrast control setting.

The connection of the bottom terminal of resistor 18 to point "C" rather than to ground is of real importance, since it is this fact which permits resistor 56 to compensate for contrast-change-produced voltage across the resistor 54. Throughout the above description, the action of resistor 52 has been disregarded, since that resistor is the minimum permissible cathode biasing resistor and is quite small in comparison with resistors 54 and 56, as indicated on the drawing.

From the foregoing, it should now be apparent that the present invention provides an effective video contrast control which does not capacitively load the video amplifier but which does provide gain to the signal applied to the separator, such gain being in the nature of current gain primarily, rather than voltage gain. Additionally, the present invention affords a low impedance source of composite signal for the sync separator, which source does not have a varying signal level as a result of contrast control setting. Finally, it will be seen that resistor 56 permits variation of the contrast control resistor 54 without changing the input level applied to the video amplifier. By way of summary, the present invention meets the four requirements set forth supra, in a simple, yet extremely effective manner.

Having thus described my invention, what I claim as new and desire to secure by Letters Patent is:

1. Gain control apparatus for an amplifier having an electron-emitting electrode, an electron-collecting electrode and a conduction-controlling electrode, which comprises: a variable resistor and a second resistor connected in series; means connecting one end of said variable resistor to said electron-emitting electrode; means connecting the end of said second resistor remote from said variable resistor to a point of fixed potential; resistive means defining a direct current connection between said conduction-controlling electrode and the junction of said variable and second resistors; means for applying a signal across said resistive means; a load circuit operatively connected to said electron-collecting electrode; a utilization circuit; and means connecting said utilization circuit to said electron-emitting electrode.

2. Gain control apparatus for an amplifier having a cathode, anode and control electrode, which comprises: a variable resistor; a second resistor; means connecting said resistors in series between said cathode and a point of fixed potential such that said variable resistor is remote from said point of fixed potential; means for applying a signal between said control electrode and the junction of said first and second resistors; and an anode load circuit operatively connected to said anode, such that variation of said variable resistor controls the gain of said amplifier for signals appearing in said anode load circuit.

3. Gain control apparatus for an amplifier having a cathode, anode and control electrode, which comprises: a variable gain control resistor; a second resistor; means defining a junction between said variable resistor and said second resistor; means connecting the end of said variable resistor remote from said junction to said cathode; means connecting the end of said second resistor remote from said junction to a point of fixed potential; a source of signals to be amplified; means for coupling said source of signals between said control electrode and said junction; a load circuit operatively connected to said anode for delivering an amplified version of signals from said source; and means for deriving a second version of such signals from said cathode, such that the amplitude of signals appearing at said cathode is substantially independent of the setting of said gain control resistor.

4. Gain control apparatus for an amplifier having a cathode, an anode and a control electrode, which comprises: an unbypassed variable resistor; and unbypassed second resistor; means defining a junction between said variable resistor and said second resistor; means connecting the end of said variable resistor remote from said junction to said cathode; means connecting the end of said second resistor remote from said junction to a point of fixed potential; a source of signals to be amplified; means for applying signals from said source between said control electrode and said junction; a load circuit operatively connected to said anode; a utilization circuit having an input terminal; and means coupling said anode to said input terminal.

5. The invention as defined by claim 4 including a second utilization circuit having an input terminal; and means coupling said cathode of said amplifier to said input terminal of said second utilization circuit.

6. The invention as defined by claim 4 wherein said last-named means comprises a resistor connected between said control electrode and said junction.

References Cited in the file of this patent

UNITED STATES PATENTS

| | | |
|---|---|---|
| 2,504,175 | Bradley | Apr. 18, 1950 |
| 2,522,967 | Shaw | Sept. 19, 1950 |
| 2,546,338 | Glasford et al. | Mar. 27, 1951 |
| 2,655,557 | Stanbury | Oct. 13, 1953 |